US009469756B2

(12) United States Patent
Kuroki et al.

(10) Patent No.: US 9,469,756 B2
(45) Date of Patent: Oct. 18, 2016

(54) RESIN COMPOSITION AND MELT BAG

(75) Inventors: Takayuki Kuroki, Chiba (JP); Yukio Adachi, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 390 days.

(21) Appl. No.: 12/935,578

(22) PCT Filed: Mar. 24, 2009

(86) PCT No.: PCT/JP2009/055808
§ 371 (c)(1),
(2), (4) Date: Sep. 29, 2010

(87) PCT Pub. No.: WO2009/122967
PCT Pub. Date: Oct. 8, 2009

(65) Prior Publication Data
US 2011/0046311 A1 Feb. 24, 2011

(30) Foreign Application Priority Data

Mar. 31, 2008 (JP) ................. 2008-092738

(51) Int. Cl.
| | |
|---|---|
| C08L 23/00 | (2006.01) |
| C08L 23/14 | (2006.01) |
| B65D 65/38 | (2006.01) |
| C08J 5/18 | (2006.01) |
| C08L 23/08 | (2006.01) |
| C08L 23/20 | (2006.01) |
| B65D 75/00 | (2006.01) |

(52) U.S. Cl.
CPC ............. *C08L 23/142* (2013.01); *B65D 65/38* (2013.01); *C08J 5/18* (2013.01); *C08L 23/0815* (2013.01); *C08L 23/20* (2013.01); *B65D 75/00* (2013.01); *C08J 2323/08* (2013.01); *C08J 2323/14* (2013.01)

(58) Field of Classification Search
CPC .................................................. C08L 23/142
USPC ......................................................... 525/240
See application file for complete search history.

(56) References Cited

U.S. PATENT DOCUMENTS

| | | | |
|---|---|---|---|
| 4,734,328 A | 3/1988 | Kohyama et al. | |
| 4,975,492 A | 12/1990 | Kondo et al. | |
| 4,990,640 A | 2/1991 | Tsutsui et al. | |
| 5,115,030 A | 5/1992 | Tanaka et al. | |
| 5,153,157 A | 10/1992 | Hlatky et al. | |
| 5,254,612 A * | 10/1993 | Sugi ........................... C08J 5/18 524/274 |
| 5,321,106 A | 6/1994 | LaPointe | |
| 5,561,092 A | 10/1996 | Ewen et al. | |
| 5,614,457 A | 3/1997 | Ewen et al. | |
| 5,663,249 A | 9/1997 | Ewen et al. | |
| 5,677,408 A | 10/1997 | Ueda et al. | |
| 6,121,395 A | 9/2000 | Turner | |
| 6,214,447 B1 * | 4/2001 | Nakagawa ............... B32B 27/32 428/215 |
| 6,417,120 B1 | 7/2002 | Mitchler et al. | |
| 6,462,136 B1 | 10/2002 | Saito et al. | |
| 6,770,355 B1 | 8/2004 | Minami et al. | |
| 6,939,928 B1 | 9/2005 | Kawai et al. | |
| 7,449,533 B2 | 11/2008 | Kawai et al. | |
| 7,488,789 B2 | 2/2009 | Ikenaga et al. | |
| 2006/0047073 A1 * | 3/2006 | Inoue ............................ 525/191 |
| 2006/0276607 A1 * | 12/2006 | Ikenaga ................ C08L 23/142 526/348.6 |
| 2008/0255311 A1 * | 10/2008 | Chang et al. ................. 525/240 |

FOREIGN PATENT DOCUMENTS

| | | |
|---|---|---|
| CN | 1030596 A | 1/1989 |
| CN | 1289353 A | 3/2001 |
| CN | 1384848 A | 12/2002 |
| CN | 1740223 A | 3/2006 |
| EP | 0 686 648 A1 | 12/1995 |
| EP | 0 844 280 A1 | 5/1998 |
| EP | 2 042 553 A1 | 4/2009 |
| JP | 01-501950 | 7/1989 |
| JP | 01-502036 | 7/1989 |
| JP | 02-043242 | 2/1990 |
| JP | 02-078687 | 3/1990 |
| JP | 03-066737 | 3/1991 |
| JP | 03-179005 | 8/1991 |
| JP | 03-179006 | 8/1991 |
| JP | 03-207703 | 9/1991 |

(Continued)

OTHER PUBLICATIONS

Exact flyer, 2005.*
Engage ENR 7256 flyer, 1996.*
Engage ENR 7467 flyer, 1996.*

(Continued)

*Primary Examiner* — Irina Krylova
(74) *Attorney, Agent, or Firm* — Foley & Lardner LLP

(57) ABSTRACT

Melt bags of the invention are molten uniformly at temperatures lower than melting operation temperatures in the product manufacturing and do not remain unmolten in the final products. The melt bags have high storage stability and excellent mechanical properties. Resin compositions of the invention are suited to give such melt bags.

A resin composition of the invention includes a propylene/C2-20 α-olefin (except propylene) copolymer (A) having (1) a melting point (Tm) of not more than 90° C. as measured by differential scanning calorimetry (DSC) or not showing a melting point peak in DSC, and an ethylene/C3-20 α-olefin copolymer (B) having (1) a melting point (Tm) of not more than 90° C. as measured by differential scanning calorimetry (DSC) or not showing a melting point peak in DSC, the weight ratio of these copolymers (A)/(B) being in the range of 99/1 to 1/99.

7 Claims, No Drawings

(56) References Cited

FOREIGN PATENT DOCUMENTS

| | | | |
|---|---|---|---|
| JP | 03-207704 | | 9/1991 |
| JP | 06-263935 | | 9/1994 |
| JP | 9-221571 | | 8/1997 |
| JP | 10-147615 | | 6/1998 |
| JP | 10-212382 | | 8/1998 |
| JP | 2000-355359 | | 12/2000 |
| JP | 2004-002581 | | 1/2004 |
| JP | 2004-051675 | | 2/2004 |
| JP | 2004051675 | * | 2/2004 |
| JP | 2005-170428 | | 6/2005 |
| JP | 2005-219818 | | 8/2005 |
| JP | 2006-001979 | | 1/2006 |
| JP | 2006-89729 | | 4/2006 |
| WO | WO-95/14717 A1 | | 6/1995 |
| WO | WO-01/27124 A1 | | 4/2001 |
| WO | WO-2004/087775 A1 | | 10/2004 |
| WO | WO 2008/007575 A1 | | 1/2008 |

OTHER PUBLICATIONS

Tsutsui, et al. "Propylene homo- and copolymerization with ethylene using an ethylenebis(1-indenyl) zirconium dichloride and methylaluminoxane catalyst system" Polymer, Jul. 1989, vol. 30, pp. 1350-1356.

Communication (Supplementary European Search Report) in EP Appln No. 09 72 6785 dated Apr. 4, 2011.

International Search Report for International Patent Application No. PCT/JP2009/055808, completed Jun. 30, 2009, 2 pgs.

Office Action Japanese Patent Application No. 2010-505669 dated May 14, 2013.

"Outlook of the next generation polymer and metallocene catalyst", CMC Technical Library, Edited by Kazuo Soga, Published on Dec. 25, 2001, trade edition, p. 34.

Office Action issued in Japanese Patent Application No. 2013-238809 dated Dec. 9, 2014.

Office Action issued in Chinese Patent Application No. 201410264314.2 dated Nov. 18, 2015.

* cited by examiner

RESIN COMPOSITION AND MELT BAG

FIELD OF THE INVENTION

The present invention relates to resin compositions comprising a specific propylene/C2-20 α-olefin (except propylene) copolymer and a specific ethylene/C3-20 α-olefin copolymer, melt bags formed using the resin composition, and packages containing the melt bag.

BACKGROUND OF THE INVENTION

When traffic paints for road signs, hot-melt adhesives and rubber modifiers such as carbon blacks are mixed with other materials, they are often supplied and molten in a Bunbury mixer or a melting furnace in the form of packages in films or bags.

Melt bags are a type of packaging bags which are molten along with contents in the processing of the contents into products or in the use of the products, and are uniformly dispersed in the products. The use of melt bags is expected to provide benefits such as improved disposal problems with used bags, a cleaner environment in taking the contents out of the bags, higher workability and easier weighing.

Materials for the melt bags include ethylene/acrylate copolymers (EEA), ethylene/methacrylate copolymers, ethylene/vinyl acetate copolymers (EVA), resins obtained by compounding these copolymers with a small amount of polyethylene, and ethylene/α-olefin copolymers (for example, Patent Documents 1 to 4).

However, the melt bags formed of these materials cannot be molten uniformly at below melting operation temperatures and remain unmolten in the final products, deteriorating the appearance and properties. Further, these melt bags are still unsatisfactory in storage stability when filled with contents or in mechanical properties of the melt bags.

Patent Document 1: JP-A-2005-219818
Patent Document 2: JP-A-2005-170428
Patent Document 3: JP-A-2004-2581
Patent Document 4: JP-A-2000-355359

SUMMARY OF THE INVENTION

The present invention is aimed at solving the problems in the art as described above. It is therefore an object of the invention to provide films which are molten uniformly at below melting operation temperatures and do not remain unmolten in the final products and which have high storage stability and excellent mechanical properties. It is another object to provide melt bags formed of the films, resin compositions suited for the production of packages containing the melt bags, and melt bags formed using the resin compositions.

The present inventors studied diligently to solve the problems as described above. They have then developed films which are formed of a resin composition including a specific propylene/C2-20 α-olefin (except propylene) copolymer and a specific ethylene/C3-20 α-olefin copolymer. The inventors have found that the films and melt bags formed of the films are molten uniformly at low temperatures, do not remain unmolten in the final products, and are excellent in storage stability and mechanical properties. The present invention has been completed based on the findings.

The present invention is concerned with the following [1] to [14].

[1] A resin composition according to the present invention comprises a propylene/C2-20 α-olefin (except propylene) copolymer (A) having (1) a melting point (Tm) of not more than 90° C. as measured by differential scanning calorimetry (DSC) or not showing a melting point peak in DSC, and an ethylene/C3-20 α-olefin copolymer (B) having (1) a melting point (Tm) of not more than 90° C. as measured by differential scanning calorimetry (DSC) or not showing a melting point peak in DSC, the weight ratio of these copolymers (A)/(B) being in the range of 99/1 to 1/99.

[2] In a preferred embodiment of the resin composition, the propylene/C2-20 α-olefin (except propylene) copolymer (A) contains (2) structural units derived from propylene in an amount of 51 to 95 mol % and structural units derived from the C2-20 α-olefin (except propylene) in an amount of 5 to 49 mol %, and the ethylene/C3-20 α-olefin copolymer (B) contains (2) structural units derived from ethylene in an amount of 50 to 95 mol % and structural units derived from the C3-20 α-olefin in an amount of 5 to 50 mol %.

[3] In a preferred embodiment, the propylene/C2-20 α-olefin (except propylene) copolymer (A) has (3) a molecular weight distribution (Mw/Mn) of not more than 3.0 as measured by gel permeation chromatography (GPC).

[4] In a preferred embodiment, the propylene/C2-20 α-olefin (except propylene) copolymer (A) is propylene/1-butene copolymer.

[5] In a preferred embodiment, the ethylene/C3-20 α-olefin copolymer (B) has (3) a molecular weight distribution (Mw/Mn) of not more than 3.0 as measured by gel permeation chromatography (GPC).

[6] In a preferred embodiment, the ethylene/C3-20 α-olefin copolymer (B) is ethylene/1-butene copolymer.

[7] A film according to the present invention comprises the resin composition as described above.

[8] A melt bag according to the present invention is formed using a resin composition which comprises a propylene/C2-20 α-olefin (except propylene) copolymer (A) having (1) a melting point (Tm) of not more than 90° C. as measured by differential scanning calorimetry (DSC) or not showing a melting point peak in DSC, and an ethylene/C3-20 α-olefin copolymer (B) having (1) a melting point (Tm) of not more than 90° C. as measured by differential scanning calorimetry (DSC) or not showing a melting point peak in DSC, the weight ratio of these copolymers (A)/(B) being in the range of 100/0 to 1/99.

[9] In a preferred embodiment of the melt bag, the propylene/C2-20 α-olefin (except propylene) copolymer (A) contains (2) structural units derived from propylene in an amount of 51 to 95 mol % and structural units derived from the C2-20 α-olefin (except propylene) in an amount of 5 to 49 mol %, and the ethylene/C3-20 α-olefin copolymer (B) contains (2) structural units derived from ethylene in an amount of 50 to 95 mol % and structural units derived from the C3-20 α-olefin in an amount of 5 to 50 mol %.

[10] In a preferred embodiment of the melt bag, the propylene/C2-20 α-olefin (except propylene) copolymer (A) has (3) a molecular weight distribution (Mw/Mn) of not more than 3.0 as measured by gel permeation chromatography (GPC).

[11] In a preferred embodiment of the melt bag, the propylene/C2-20 α-olefin (except propylene) copolymer (A) is propylene/1-butene copolymer.

[12] In a preferred embodiment of the melt bag, the ethylene/C3-20 α-olefin copolymer (B) has (3) a molecular weight distribution (Mw/Mn) of not more than 3.0 as measured by gel permeation chromatography (GPC).

[13] In a preferred embodiment of the melt bag, the ethylene/C3-20 α-olefin copolymer (B) is ethylene/1-butene copolymer.

[14] A package according to the present invention includes the melt bag as described above.

Advantageous Effects of the Invention

The resin compositions of the invention are molten uniformly at temperatures lower than melting operation temperatures in the product manufacturing and do not remain unmolten in the final products, and are excellent in storage stability and mechanical properties. The compositions are therefore suitably used to produce films, melt bags and packages. The melt bags of the invention allow for favorable preservation of contents, and are molten uniformly at low temperatures and do not remain unmolten in the final products.

PREFERRED EMBODIMENTS FOR CARRYING OUT THE INVENTION

The present invention will be described in detail below.
A resin composition according to the present invention includes a specific propylene/C2-20 α-olefin (except propylene) copolymer (A) and a specific ethylene/C3-20 α-olefin copolymer (B).
A melt bag according to the invention is formed using a resin composition that includes a specific propylene/C2-20 α-olefin (except propylene) copolymer (A) and a specific ethylene/C3-20 α-olefin copolymer (B).
<Propylene/C2-20 α-Olefin (Except Propylene) Copolymers (A)>

The propylene/C2-20 α-olefin (except propylene) copolymers (A) satisfy the melting point (Tm) (1) described below, and preferably satisfy the requirement (2) described below. More preferably, the copolymers satisfy the requirement (3) described below in addition to the requirement (1) or the requirements (1) and (2). Still more preferably, the copolymers satisfy at least one of the requirements (4) and (5) described below in addition to any of the requirement (1), the requirements (1) and (2), the requirements (1) and (3), and the requirements (1), (2) and (3). In the most preferred embodiment, the copolymers satisfy all the requirements (1) to (6) described below.

(1) The copolymers have a melting point (Tm) of not more than 90° C. as measured by differential scanning calorimetry (DSC) or do not show a melting point peak in DSC. In a preferred embodiment, the melting point (Tm) is in the range of 40 to 85° C., more preferably 45 to 85° C., and still more preferably 50 to 80° C. If the melting point is below 40° C., the obtainable composition will have tackiness at room temperature and is likely to cause problems such as blocking. If the melting point exceeds 90° C., the obtainable composition will remain unmolten in the final products.

(2) The copolymers contain structural units derived from propylene in an amount of 51 to 95 mol %, preferably 55 to 90 mol %, more preferably 60 to 80 mol %, and structural units derived from the C2-20 α-olefin (except propylene) in an amount of 5 to 49 mol %, preferably 10 to 45 mol %, more preferably 20 to 40 mol %. This propylene content ensures that the obtainable melt bags do not remain unmolten in the final products and that tackiness is not caused around room temperature and problems such as blocking of the melt bags are prevented.

The propylene/C2-20 α-olefin (except propylene) copolymers (A) may contain structural units derived from propylene and structural units derived from a plurality of C2-20 α-olefins (except propylene). The C2-20 α-olefins (except propylene) include ethylene, 1-butene, 1-pentene, 1-hexene, 1-heptene, 1-octene, 1-decene, 1-dodecene, 1-hexadecene and 4-methyl-1-pentene. A preferred structural unit derived from the C2-20 α-olefin (except propylene) is 1-butene.

(3) The copolymers have a molecular weight distribution (Mw/Mn) of not more than 3.0, preferably in the range of 1.5 to 2.8, and more preferably 1.7 to 2.5 as measured by gel permeation, chromatography (GPC). The molecular weight distribution (Mw/Mn) in this range ensures that blocking due to low-molecular weight components or unmolten high-molecular weight component residues are reduced.

(4) The intrinsic viscosity [η] as measured at 135° C. in decalin is in the range of 0.1 to 12 dl/g, preferably 0.2 to 10 dl/g, and more preferably 0.3 to 5 dl/g.

(5) The melting point Tm as measured by differential scanning calorimetry is not more than 90° C., preferably in the range of 40 to 85° C., more preferably 45 to 85° C., and the melting point Tm and the content M (mol %) of structural units derived from the C2-20 α-olefin (except propylene) satisfy the following relation:

$$-2.6M+130 \leq Tm \leq -2.3M+155.$$

(6) When the copolymer is analyzed by $^{13}$C-NMR spectroscopy (hexachlorobutadiene solution, tetramethylsilane standard) with respect to the side-chain methyl group in the propylene unit that is the second unit in (i) head-to-tail coupled propylene unit triad sequences or (ii) propylene/C2-20 α-olefin (except propylene) triad sequences composed of head-to-tail coupled propylene unit(s) and C2-20 α-olefin (except propylene) unit(s) and having the propylene unit as the second unit, the areas of peaks observed at 21.0 to 21.9 ppm (triad tacticity) represent not less than 90%, preferably not less than 92%, and more preferably not less than 94% of the total of areas at 19.5 to 21.9 ppm as 100%. The triad tacticity in this range ensures that problems such as blocking are not caused.

The stereoregularity of the propylene/C2-20 α-olefin (except propylene) copolymers (A) may be evaluated based on the triad tacticity (mm fraction).

In propylene/butene-1 random copolymer as an example, the mm fraction is defined as a proportion of triad sequences that have the methyl groups branched in the same direction, relative to all the triad sequences in the polymer chain that are head-to-tail coupled to show a zigzag structure. The mm fraction is determined from a $^{13}$C-NMR spectrum as described below.

In the determination of the mm fraction from a $^{13}$C-NMR spectrum, the polymer chains are analyzed to determine the mm fraction of triad sequences containing a propylene unit(s), in detail (i) head-to-tail coupled propylene unit triad sequences and (ii) propylene unit/butene-1 unit triad sequences that are composed of head-to-tail coupled propylene unit(s) and butene-1 unit(s) and have the propylene unit as the second unit.

The mm fraction is obtained from peak intensities assigned to the side-chain methyl groups in the second units (propylene units) of the triad sequences (i) and (ii).

The propylene/C2-20 α-olefin (except propylene) copolymers (A) usually have a melt flow rate MFR (ASTM D1238, 230° C., 2.16 kg load) in the range of 0.5 to 20 g/10 min, and preferably 1 to 10 g/10 min.

A detailed description is given below.
To obtain a $^{13}$C-NMR spectrum of the propylene/C2-20 α-olefin (except propylene) copolymer (A), the propylene/

C2-20 α-olefin (except propylene) copolymer is completely dissolved in a lock solvent consisting of hexachlorobutadiene and a small amount of deuterated benzene in a sample tube, and the resultant sample is analyzed by complete proton decoupling at 120° C. Measurement conditions are such that the flip angle is 45° and the pulse intervals are at least 3.4 $T_1$ ($T_1$ is the longest spin-lattice relaxation time of the methyl group). The methylene and methine groups have shorter $T_1$ than that of the methyl group, and therefore all the carbon atoms in the sample will have a magnetization recovery rate of 99% or more under the above conditions. The chemical shifts are determined based on tetramethylsilane as the reference compound, and the peak assigned to the methyl group carbon of the third unit in head-to-tail coupled propylene unit pentad sequences (mmmm) is determined to be 21.593 ppm and other carbon peaks are determined based on this peak.

With respect to the $^{13}$C-NMR spectrum of the propylene/C2-20 α-olefin (except propylene) copolymer recorded as above, the regions having methyl carbon peaks assigned to the side-chain methyl groups of the propylene units (approximately 19.5 to 21.9 ppm) are divided into the first peak region (approximately 21.0 to 21.9 ppm), the second peak region (approximately 20.2 to 21.0 ppm) and the third peak region (approximately 19.5 to 20.2 ppm).

In these peak regions, the carbons in the side-chain methyl groups in the second units (propylene units) of the head-to-tail coupled triad sequences (i) and (ii) give peaks as shown in Table 1.

TABLE 1

| | | Methyl carbon regions (19.5-21.9 ppm) | | |
|---|---|---|---|---|
| | Shifts | First region 21.0-21.9 ppm | Second region 20.2-21.0 ppm | Third region 19.5-20.2 ppm |
| | Sequence (i) | PPP (mm) | PPP (mr) | PPP (rr) |
| Head-to-tail coupled | Sequence (ii) | PPB (mm) BPB (mm) | PPB (mr) BPB (mr) PPB (rr) BPB (rr) | |

In Table 1, P denotes a unit derived from propylene, and B denotes a unit derived from the C2-20 α-olefin (except propylene) such as butene.

Of the head-to-tail coupled triad sequences (i) and (ii) given in Table 1, the triad sequences (i) PPP (mm), PPP (mr) and PPP (rr) consisting of three propylene units are illustrated below in zigzag structures reflecting the branching direction of the methyl groups. These illustrations of mm, mr and rr couplings in PPP also apply to the triad sequences (ii) (PPB and BPB) that contain C2-20 α-olefin (except propylene) unit(s).

[Chem. 1]

(1)

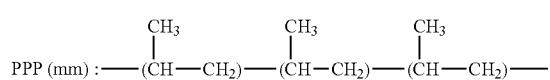

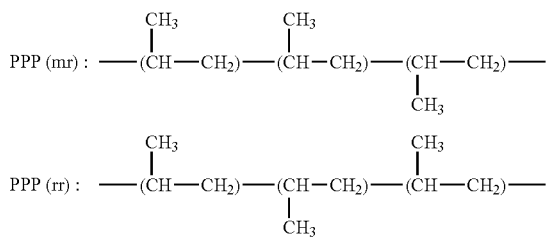

In the first region, the methyl groups in the second units (propylene units) of the mm-coupled triad sequences PPP, PPB and BPB give resonance peaks.

The second region shows resonance peaks of the methyl groups in the second units (propylene units) of the mr-coupled triad sequences PPP, PPB and BPB, and resonance peaks assigned to the methyl groups in the second units (propylene units) of the rr-coupled triad sequences PPB and BPB.

In the third region, the methyl groups in the second units (propylene units) of the rr-coupled triad sequences PPP give a resonance peaks.

Accordingly, the triad tacticity (mm fraction) of the propylene elastomer is a proportion (percentage) of the area of the peaks observed in the range of 21.0 to 21.9 ppm (the first region) relative to the total (100%) of the areas of the peaks found within 19.5 to 21.9 ppm (the methyl carbon regions) according to measurement by $^{13}$C-NMR spectroscopy (hexachlorobutadiene solution, tetramethylsilane standard) based on the side-chain methyl groups in the second propylene units of (i) the head-to-tail coupled propylene unit triad sequences or (ii) the propylene/C2-20 α-olefin (except propylene) triad sequences composed of head-to-tail coupled propylene unit(s) and C2-20 α-olefin (except propylene) unit(s) and having the propylene unit as the second unit. Specifically, the mm fraction may be obtained from the following equation:

[Formula 1]

$$mm \text{ fraction } (\%) = \frac{[PPP(mm) + PPB(mm) + BPB(mm)]}{\substack{\text{Intensities of methyl groups} \\ [PPP(mm) + PPB(mm) + BPB(mm) + \\ PPP(mr) + PPB(mr) + BPB(mr) + \\ PPP(rr) + PPB(rr) + BPB(rr)]}} \quad (1)$$

(numerator label: Intensities of methyl groups)

The mm fraction of the propylene/C2-20 α-olefin (except propylene) copolymer (A) is 90% or more, preferably 92% or more, and more preferably 94% or more.

The propylene elastomer contains, in addition to the head-to-tail coupled triad sequences (i) and (ii), small amounts of structural units that include irregularly arranged units as illustrated in the structures (iii), (iv) and (v). The side-chain methyl groups in these otherwise coupled propylene units also show peaks within the above methyl carbon regions (19.5 to 21.9 ppm).

[Chem. 2]

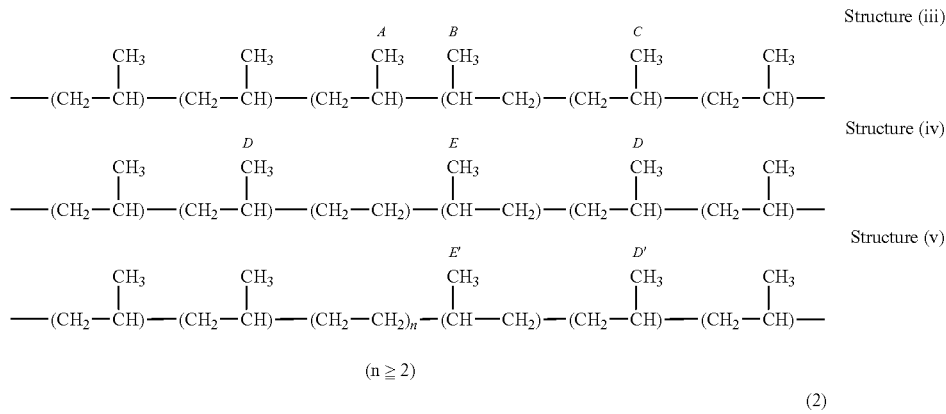

(2)

In the methyl groups in these structures (iii), (iv) and (v), the methyl group carbons A and B give resonance peaks at 17.3 ppm and 17.0 ppm respectively, outside the first to third regions (19.5 to 21.9 ppm). Since the carbons A and B are not involved in the formation of head-to-tail coupled propylene triad sequences, the peaks thereof should be neglected in the calculation of the triad tacticity (mm fraction).

Meanwhile, the peaks assigned to the methyl group carbons C, D and D' appear in the second region, and those assigned to the methyl group carbons E and E' are found in the third region.

Therefore, the first to third methyl carbon regions show the peaks assigned to the PPE-methyl groups (the side-chain methyl groups in propylene-propylene-ethylene sequences) (near 20.7 ppm), the EPE-methyl groups (the side-chain methyl groups in ethylene-propylene-ethylene sequences) (near 19.8 ppm), the methyl groups C, the methyl groups D, the methyl groups D', the methyl groups E and the methyl groups E'.

As described above, the methyl carbon regions show peaks assigned to the methyl groups in sequences other than the head-to-tail coupled triad sequences (i) and (ii). These peaks are corrected as described below in the determination of the mm fraction from the above formula.

The peak area of the PPE-methyl groups can be obtained from the peak area of the PPE-methine groups (resonating near 30.6 ppm). The peak area of the EPE-methyl groups can be obtained from the peak area of the EPE-methine groups (resonating near 32.9 ppm). The peak area of the methyl groups C can be obtained from the peak area of the adjacent methine groups (resonating near 31.3 ppm). The peak area of the methyl groups D is half the combined peak areas of α and β methylene carbons in the structure (iv) (resonating near 34.3 ppm and near 34.5 ppm). The peak area of the methyl groups D' can be obtained from the peak area of the methine groups (resonating near 33.3 ppm) adjacent to the methyl groups E' in the structure (v). The peak area of the methyl groups E can be obtained from the peak area of the adjacent methine carbons (resonating near 33.7 ppm). The peak area of the methyl groups E' can be obtained from the peak area of the adjacent methine carbons (resonating near 33.3 ppm).

Accordingly, subtracting these peak areas from the total peak areas in the second and third regions gives an area of the peaks assigned to the methyl groups in the head-to-tail coupled propylene unit triad sequences (i) and (ii).

The mm fraction is calculated according to the above-described formula based on the peak area of the methyl groups in the head-to-tail coupled propylene unit triad sequences (i) and (ii) provided by the above subtraction. The carbon peaks found in the spectrum may be assigned with reference to the literature (Polymer, 30, 1350 (1989)).

The propylene/C2-20 α-olefin (except propylene) copolymers (A) may be favorably obtained by copolymerizing propylene, a C2-20 α-olefin except propylene and optionally small amounts of other olefins as required in the presence of a Ziegler-Natta catalyst or a catalyst containing a metallocene compound. The Ziegler-Natta catalysts may be produced by methods as described in JP-A-H02-43242, JP-A-H03-66737 and JP-A-H06-263935. The catalysts containing a metallocene compound may be prepared by methods as disclosed in WO 2004/087775 and WO 01/27124.

In more detail, the propylene/C2-20 α-olefin (except propylene) copolymers (A) may be produced by copolymerizing propylene and a C2-20 α-olefin (except propylene), preferably by copolymerizing propylene and 1-butene as the α-olefin, in the presence of a Ziegler-Natta catalyst which contains (a) a complex containing at least magnesium, titanium and halogen, (b) an organometallic compound having a metal of Group 1 to Group 3 of the periodic table, and (c) an electron donor. Part or whole of the electron donor (c) may be immobilized on part or whole of the complex (a) or may be brought into contact with the organometallic compound (b) before use. In a particularly preferred embodiment, part of the electron donor (c) is immobilized on the complex (a) and the remaining part of the electron donor is supplied to the polymerization system directly or after preliminarily contacted with the organometallic compound (b). In this embodiment, the electron donor immobilized on the complex (a) and the electron donor that is directly supplied to the polymerization system or preliminarily contacted with the organometallic compound (b) may be the same or different from each other.

In a preferred embodiment, the propylene/C2-20 α-olefin (except propylene) copolymer (A) is produced by copolymerizing propylene and a C2-20 α-olefin (except propylene) in the presence of a metallocene catalyst that contains a transition metal compound (1a) represented by Formula (1a) below. Herein, the catalyst containing the transition metal compound (1a) preferably contains together with the transition metal compound (1a) at least one compound selected from (2a) organometallic compounds, (2b) organoaluminum oxy-compounds and (2c) compounds capable of reacting with the transition metal compound (1a) to form an ion pair.

[Chem. 3]

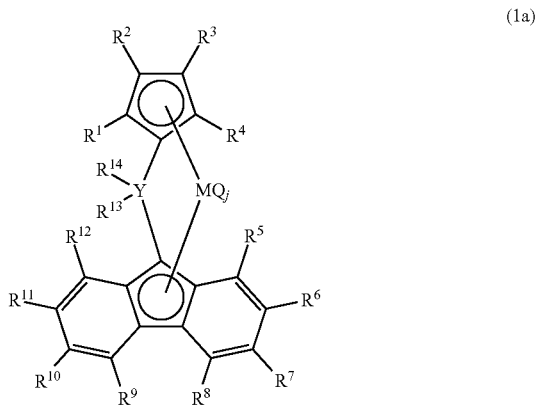

(1a)

In Formula (1a), $R^1$ and $R^3$ are each a hydrogen atom; $R^2$ and $R^4$ are each selected from hydrocarbon groups and silicon-containing groups and may be the same or different from each other; $R^5$, $R^6$, $R^7$, $R^8$, $R^9$, $R^{10}$, $R^{11}$, $R^{12}$, $R^{13}$ and $R^{14}$ are each selected from hydrogen atom, hydrocarbon groups and silicon-containing groups and may be the same or different from one another; adjacent substituent groups of $R^5$ to $R^{12}$ may be linked with each other to form a ring; $R^{13}$ and $R^{14}$ are the same or different from each other and may be linked together to form a ring; M is a Group 4 transition metal; Y is a carbon atom; Q is a halogen, a hydrocarbon group, an anionic ligand or a neutral ligand capable of coordination via a lone pair of electrons, and may be the same or different when plural; and j is an integer ranging from 1 to 4.

The hydrocarbon groups include linear hydrocarbon groups such as methyl, ethyl, n-propyl, allyl, n-butyl, n-pentyl, n-hexyl, n-heptyl, n-octyl, n-nonyl and n-decanyl groups; branched hydrocarbon groups such as isopropyl, tert-butyl, amyl, 3-methylpentyl, 1,1-diethylpropyl, 1,1-dimethylbutyl, 1-methyl-1-propylbutyl, 1,1-propylbutyl, 1,1-dimethyl-2-methylpropyl and 1-methyl-1-isopropyl-2-methylpropyl groups; saturated cyclic hydrocarbon groups such as cyclopentyl, cyclohexyl, cycloheptyl, cyclooctyl, norbornyl and adamantyl groups; unsaturated cyclic hydrocarbon groups such as phenyl, tolyl, naphthyl, biphenyl, phenanthryl and anthracenyl groups; saturated hydrocarbon groups substituted with unsaturated cyclic hydrocarbon groups, such as benzyl, cumyl, 1,1-diphenylethyl and triphenylmethyl groups; and heteroatom-containing hydrocarbon groups such as methoxy, ethoxy, phenoxy, furyl, N-methylamino, N,N-dimethylamino, N-phenylamino, pyrryl and thienyl groups.

The silicon-containing groups include trimethylsilyl, triethylsilyl, dimethylphenylsilyl, diphenylmethylsilyl and triphenylsilyl groups. Adjacent substituent groups of $R^5$ to $R^{12}$ may link together to form a ring. Examples of such substituted fluorenyl groups include benzofluorenyl, dibenzofluorenyl, octahydrodibenzofluorenyl, octamethyloctahydrodibenzofluorenyl and octamethyltetrahydrodicyclopentafluorenyl groups.

In Formula (1a), and $R^4$ on the cyclopentadienyl ring are preferably C1-20 hydrocarbon groups. Examples of the C1-20 hydrocarbon groups include the aforementioned hydrocarbon groups. More preferably, $R^2$ is a bulky substituent group such as tert-butyl, adamantyl or triphenylmethyl group, and $R^4$ is a dimensionally smaller substituent group than $R^2$, such as methyl, ethyl or n-propyl group. As used herein, the words "dimensionally smaller" mean that the substituent group has a smaller volume.

Of the substituent groups $R^5$ to $R^{12}$ on the fluorene ring in Formula (1a), arbitrary two or more groups of $R^6$, $R^7$, $R^{10}$ and $R^{11}$ are preferably C1-20 hydrocarbon groups. Examples of the C1-20 hydrocarbon groups include the aforesaid hydrocarbon groups. For the purpose of easy synthesis of the ligand, these groups are preferably symmetrical, in detail $R^6$ and $R^{11}$ are the same groups and $R^7$ and $R^{10}$ are the same groups. In one of such preferred embodiments, $R^6$ and $R^7$ form an aliphatic ring (AR-1) and $R^{10}$ and $R^{11}$ form an aliphatic ring (AR-2) identical to the aliphatic ring (AR-1).

Referring to Formula (1a), Y which bridges the cyclopentadienyl ring and the fluorenyl ring is a carbon atom. The substituent groups $R^{13}$ and $R^{14}$ bonded to Y are preferably both aryl groups having 6 to 20 carbon atoms. These substituent groups may be the same or different from each other and may link together to form a ring. Exemplary C6-20 aryl groups include the above-mentioned unsaturated cyclic hydrocarbon groups, saturated hydrocarbon groups substituted with unsaturated cyclic hydrocarbon groups, and heteroatom-containing unsaturated cyclic hydrocarbon groups. $R^{13}$ and $R^{14}$ may be the same or different from each other and may link together to form a ring. Preferred examples of such substituent groups include fluorenylidene, 10-hydroanthracenylidene and dibenzocycloheptadienylidene groups.

In Formula (1a), M denotes a Group 4 transition metal such as Ti, Zr or Hf; Q denotes a halogen atom, a hydrocarbon group, an anionic ligand or a neutral ligand capable of coordination via a lone pair of electrons, and may be the same or different when plural; and j is an integer of 1 to 4. When j is 2 or greater, the plurality of Q may be the same or different. The halogens include fluorine, chlorine, bromine and iodine. Examples of the hydrocarbon groups are as described above. Exemplary anionic ligands include alkoxy groups such as methoxy, tert-butoxy and phenoxy groups; carboxylate groups such as acetate and benzoate groups; and sulfonate groups such as mesylate and tosylate groups. The neutral ligands capable of coordination via a lone pair of electrons include organophosphorus compounds such as trimethylphosphine, triethylphosphine, triphenylphosphine and diphenylmethylphosphine; and ethers such as tetrahydrofuran, diethyl ether, dioxane and 1,2-dimethoxyethane. In a preferred embodiment, at least one Q is a halogen atom or an alkyl group.

Examples of the transition metal compounds (1a) include but are not limited to isopropylidene (3-tert-butyl-5-methylcyclopentadienyl)(fluorenyl) zirconium dichloride, isopropylidene (3-tert-butyl-5-methylcyclopentadienyl) (2,7-di-tert-butylfluorenyl)zirconium dichloride, isopropylidene (3-tert-butyl-5-methylcyclopentadienyl) (3,6-di-tert-butylfluorenyl)zirconium dichloride, isopropylidene(3-tert-butyl-5-methylcyclopentadienyl) (octamethyloctahydridodibenzofluorenyl)zirconium dichloride, diphenylmethylene(3-tert-butyl-5-methylcyclopentadienyl) (fluorenyl)zirconium dichloride, diphenylmethylene (3-tert-butyl-5-methylcyclopentadienyl) (2,7-di-tert-butylfluorenyl)zirconium dichloride, diphenylmethylene(3-tert-butyl-5-methylcyclopentadienyl) (3,6-di-tert-butylfluorenyl)zirconium dichloride and diphenylmethylene(3-tert-butyl-5-methylcyclopentadienyl)(octamethyloctahydridodibenzofluorenyl)zirconium dichloride.

The catalysts that are suitably used in the production of the propylene/C2-20 α-olefin (except propylene) copolymers (A) contain, together with the transition metal compound (1a) described above, at least one compound selected from (2a) organometallic compounds, (2b) organoaluminum oxy-compounds and (2c) compounds capable of reacting with the transition metal compound (1a) to form an ion pair. These compounds (2a), (2b) and (2c) are not particularly limited. Preferred compounds include those described in WO 2004/087775 and WO 01/27124. Exemplary compounds are described below.

The organometallic compounds (2a) for use in the invention include organic compounds of Group 1, 2, 12 and 13 metals as follows.

(2a-1) Organoaluminum compounds represented by:

$$R^a{}_m Al(OR^b)_n H_p X_q$$

wherein $R^a$ and $R^b$ may be the same or different from each other and are each a hydrocarbon group of 1 to 15, and preferably 1 to 4 carbon atoms, X is a halogen atom, $0<m\leq 3$, $0\leq n<3$, $0\leq p<3$, $0\leq q<3$ and $m+n+p+q=3$. Specific examples of such compounds include trimethylaluminum, triethylaluminum, triisobutylaluminum and diisobutylaluminum hydride.

(2a-2) Alkyl complex compounds of Group 1 metal and aluminum, represented by:

$$M^2 AlR^a{}_4$$

wherein $M^2$ is Li, Na or K, and $R^a$ is a hydrocarbon group of 1 to 15, and preferably 1 to 4 carbon atoms. Specific examples of such compounds include $LiAl(C_2H_5)_4$ and $LiAl(C_7H_{15})_4$.

(2a-3) Dialkyl compounds of Group 2 or 12 metal, represented by:

$$R^a R^b M^3$$

wherein $R^a$ and $R^b$ may be the same or different from each other and are each a hydrocarbon group of 1 to 15, and preferably 1 to 4 carbon atoms, and $M^3$ is Mg, Zn or Cd.

Of the above organometallic compounds (2a), the organoaluminum compounds are preferred. The organometallic compounds (2a) may be used singly, or two or more kinds may be used in combination.

The organoaluminum oxy-compounds (2b) may be conventional aluminoxanes, or benzene-insoluble organoaluminum oxy-compounds as disclosed in JP-A-H02-78687.

For example, the conventional aluminoxanes may be prepared by the following processes, and are usually obtained as a solution in a hydrocarbon solvent.

(1) An organoaluminum compound such as trialkylaluminum is added to a hydrocarbon medium suspension of a compound containing adsorbed water or a salt containing water of crystallization (such as magnesium chloride hydrate, copper sulfate hydrate, aluminum sulfate hydrate, nickel sulfate hydrate or cerous chloride hydrate), to react the organoaluminum compound with the adsorbed water or the water of crystallization.

(2) Water, ice or water vapor is allowed to act directly on an organoaluminum compound such as trialkylaluminum in a medium such as benzene, toluene, diethyl ether or tetrahydrofuran.

(3) An organoaluminum compound such as trialkylaluminum is reacted with an organotin oxide such as dimethyltin oxide or dibutyltin oxide in a medium such as decane, benzene or toluene.

The aluminoxane may contain small amounts of organometallic components. After the solvent and unreacted organoaluminum compound are distilled away from the recovered solution of the aluminoxane, the residue may be redissolved in a solvent or suspended in a poor solvent for the aluminoxane.

Examples of the organoaluminum compounds used in preparing the aluminoxanes include the organoaluminum compounds mentioned above as the organoaluminum compounds (2a-1). Of those compounds, trialkylaluminums and tricycloalkylaluminums are preferred, and trimethylaluminum is particularly preferred.

The organoaluminum compounds may be used singly, or two or more kinds may be used in combination.

The benzene-insoluble organoaluminum oxy-compounds desirably contain Al components that will dissolve in benzene at 60° C. in an amount of 10% or less, preferably 5% or less, and particularly preferably 2% or less in terms of Al atoms. That is, the organoaluminum oxy-compounds are preferably insoluble or hardly soluble in benzene. The organoaluminum oxy-compounds (2b) may be used singly, or two or more kinds may be used in combination.

The compounds (2c) capable of reacting with the transition metal compound (1a) to form an ion pair include Lewis acids, ionic compounds, borane compounds and carborane compounds as disclosed in JP-A-H01-501950, JP-A-H01-502036, JP-A-H03-179005, JP-A-H03-179006, JP-A-H03-207703, JP-A-H03-207704 and U.S. Pat. No. 5,321,106. Further, heteropoly compounds and isopoly compounds are also usable. The compounds (2c) may be used singly, or two or more kinds may be used in combination.

In the production of the propylene/C2-20 α-olefin (except propylene) copolymers (A), particularly high polymerization activity is achieved when the catalyst contains the transition metal compound (1a) and the organoaluminum oxy-compound (2b) such as methylaluminoxane.

The polymerization catalysts for the production of the propylene/C2-20 α-olefin (except propylene) copolymers (A) may contain a carrier or a cocatalyst component as required.

Such catalysts may be prepared by mixing the components directly or after the components are supported on carriers. Alternatively, the components for the catalyst may be added to the polymerization system simultaneously or successively.

In a preferred embodiment, the propylene/C2-20 α-olefin (except propylene) copolymer (A) is produced by copolymerizing propylene and a C2-20 α-olefin (except propylene) which is particularly preferably butene, and optionally small amounts of other olefins in the presence of the aforementioned catalyst. In the copolymerization, the monomers may be used in amounts such that the desired ratio of structural units in the obtainable propylene/C2-20 α-olefin (except propylene) copolymer (A) is achieved. In detail, the monomers are desirably used in a propylene/C2-20 α-olefin (except propylene) molar ratio of 50/50 to 95/5, preferably 60/40 to 93/7, and more preferably 70/30 to 90/10.

The copolymerization conditions are not particularly limited. For example, the polymerization temperature may be usually in the range of −50 to +200° C., preferably 0 to 170° C., and the polymerization pressure may generally range from atmospheric pressure to 10 MPaG, preferably from atmospheric pressure to 5 MPaG. The polymerization reaction may be carried out batchwise, semi-continuously or continuously. In an embodiment, the polymerization may be performed in two or more stages under different reaction conditions. The molecular weight of the propylene/C2-20 α-olefin (except propylene) copolymer (A) may be controlled by the presence of hydrogen in the polymerization system or by changing the polymerization temperature. The molecular weight is also controllable by adjusting the amount of the compound (2a), (2b) or (2c) in the catalyst. When hydrogen is used, the amount thereof may be suitably in the range of about 0.001 to 100 NL per 1 kg of the monomers.

<Ethylene/C3-20 α-Olefin Copolymers (B)>

The ethylene/C3-20 α-olefin copolymers (B) may be conventional copolymers as long as they satisfy the melting point (Tm) requirement (1) described below. Preferably, the copolymers further satisfy the requirement (2) described below. More preferably, the copolymers satisfy the requirement (3) described below in addition to the requirement (1) or the requirements (1) and (2). In an optimum embodiment, the copolymers satisfy all the requirements (1) to (4) described below.

(1) The copolymers have a melting point (Tm) of not more than 90° C. as measured by differential scanning calorimetry (DSC) or do not show a melting point peak in DSC. In a preferred embodiment, the melting point (Tm) is in the range of 40 to 85° C., more preferably 45 to 85° C., and still more preferably 50 to 80° C.

(2) The copolymers contain structural units derived from ethylene in an amount of 50 to 95 mol %, preferably 60 to 90 mol %, and structural units derived from the C3-20 α-olefin in an amount of 5 to 50 mol %, preferably 10 to 40 mol %. These contents ensure that the obtainable melt bags will not remain unmolten in the final products and that tackiness is not caused around room temperature and problems such as blocking of the melt bags are reduced.

The ethylene/C3-20 α-olefin copolymers (B) may contain structural units derived from ethylene and structural units derived from a plurality of C3-20 α-olefins. The C3-20 α-olefins include propylene, 1-butene, 1-pentene, 1-hexene, 1-heptene, 1-octene, 1-decene, 1-dodecene, 1-hexadecene and 4-methyl-1-pentene. Preferred structural units derived from the C3-20 α-olefin are propylene and 1-butene, and particularly preferably 1-butene.

(3) The copolymers have a molecular weight distribution (Mw/Mn) of not more than 3.0, preferably in the range of 1.5 to 2.8, and more preferably 1.7 to 2.5 as measured by gel permeation chromatography (GPC). The molecular weight distribution (Mw/Mn) in this range ensures that blocking due to low-molecular weight components or unmolten high-molecular weight component residues are reduced.

(4) The intrinsic viscosity [η] as measured at 135° C. in decalin is in the range of 0.1 to 12 dl/g, preferably 0.2 to 10 dl/g, and more preferably 0.3 to 5 dl/g.

The ethylene/C3-20 α-olefin copolymers (B) usually have a melt flow rate MFR (ASTM D1238, 190° C., 2.16 kg load) in the range of 0.1 to 70 g/10 min, and preferably 0.2 to 35 g/10 min.

The ethylene/C3-20 α-olefin copolymers (B) may be random copolymers or block copolymers. In the invention, the ethylene/C3-20 α-olefin copolymers (B) are preferably random copolymers.

The ethylene/C3-20 α-olefin copolymers (B) may be produced by known methods using conventional solid titanium catalyst (Ziegler catalyst) components or metallocene compound catalyst components.

[Resin Compositions]

The resin compositions according to the present invention contain the propylene/C2-20 α-olefin (except propylene) copolymer (A) and the ethylene/C3-20 α-olefin copolymer (B) in a weight ratio (A)/(B) of 99/1 to 1/99, and preferably 90/10 to 10/90. The resin compositions may be suitably used in films and melt bags formed of the films as will be described later.

For the production of films that are particularly suited as melt bags, the resin composition contains the propylene/C2-20 α-olefin (except propylene) copolymer (A) and the ethylene/C3-20 α-olefin copolymer (B) in a weight ratio (A)/(B) of 100/0 to 1/99, and preferably 90/10 to 10/90.

According to a preferred embodiment, the resin composition can give melt bags having excellent rigidity and higher usability when the composition contains the propylene/C2-20 α-olefin (except propylene) copolymer (A) and the ethylene/C3-20 α-olefin copolymer (B) in a weight ratio (A)/(B) of 90/10 to 51/49.

According to another preferred embodiment, the resin composition can give melt bags having excellent melting properties (molten state) at low temperatures when the composition contains the propylene/C2-20 α-olefin (except propylene) copolymer (A) and the ethylene/C3-20 α-olefin copolymer (B) in a weight ratio (A)/(B) of 50/50 to 10/90.

The propylene/C2-20α-olefin (except propylene) copolymer (A) that is contained at not less than 1 wt % in the resin composition gives rigidity to the films obtained from the resin composition.

The use of the ethylene/C3-20 α-olefin copolymer (B) in the resin composition provides advantages that the composition has a lower melting point (Tm) and good flexibility.

The resin compositions of the invention may contain additives as required, such as antioxidants, lubricants, heat stabilizers, UV absorbers, anti-blocking agents, slip agents and antistatic agents. The amount of these additives may be in the range of 0.001 to 10 parts by weight, and preferably 0.005 to 5 parts by weight based on 100 parts by weight of the copolymers (A) and (B) combined.

Known processes may be adopted to produce the resin compositions containing the propylene/C2-20 α-olefin (except propylene) copolymer (A) and the ethylene/C3-20 α-olefin copolymer (B). For example, the components may be mixed together with a mixing apparatus such as a twin-cylinder mixer, a ribbon blender or a Henschel mixer and/or may be kneaded together by means of a kneading device such as an extruder, a mixing roll, a Banbury mixer or a kneader. The resin composition obtained by the mixing may be pelletized or granulated with an extruder or the like, or may be directly formed into a film or sheet as a resin composition layer.

[Films]

Films according to the invention are formed from the resin compositions as described above. The films are molten uniformly at temperatures lower than the melting operation temperatures in the product manufacturing, and are excellent in storage stability and mechanical properties. The films are particularly suited for the production of melt bags.

Because of the excellent mechanical properties, the films of the invention may be suitably used in applications requiring impact strength.

The films of the invention can be sealed at low temperatures to allow for the production of melt bags without deteriorating properties of the films.

The thickness of the films is not particularly limited and may be determined appropriately depending on applications. The thickness, however, is generally in the range of about 5 to 500 μm, preferably about 10 to 300 μm, and more preferably about 15 to 200 μm.

The resin compositions of the invention may be formed into any shapes without limitation. In a desired embodiment, the compositions are shaped into films or sheets (hereinafter, collectively films) for the production of the films or the melt bags according to the invention.

The films of the resin compositions include unstretched films obtained from the resin compositions by a usual T-die method or a blown-film extrusion method, and two-layer or multilayer films having the unstretched film as a surface layer on one or both sides.

[Melt Bags]

Melt bags of the invention are produced from the inventive films by known bag-making processes without limitation. In an exemplary process, a tubular film manufactured by a blown-film extrusion method is cut to a desired length and one of the openings is heat sealed.

The melt bags of the invention are molten uniformly at temperatures lower than melting operation temperatures in the product manufacturing, and are excellent in storage stability and mechanical properties, thereby finding wide use as melt bags.

Because the melt bags of the invention are molten uniformly at temperatures lower than melting operation temperatures in the product manufacturing, they do not remain unmolten in the final products.

Because of the excellent storage stability and mechanical properties, the melt bags of the invention allow for preservation of contents in good condition.

The thickness of the melt bags is variable depending on the size of the melt bags or the amount of items packed in the bags. For example, the thickness is generally in the range of about 5 to 500 µm, preferably about 10 to 300 µm, and more preferably about 15 to 200 µm.

[Packages]

Packages according to the invention include contents packed in the melt bags of the invention. The contents herein are materials that are heated and molten when used, and examples thereof include polymers, compositions of polymers and compositions of these materials with various fillers. Specific examples are road sign materials and elastomers.

Typical road sign materials contain binder components which are tackifier resins such as rosins, aliphatic hydrocarbon resins, alicyclic hydrocarbon resins, aromatic hydrocarbon resins, low-molecular vinyl aromatic compound copolymers, terpene resins and modified products of these resins, and also contain pigments, inorganic fillers and glass beads. The melt bags of the invention show very good compatibility with the aforementioned elastomers and the above road sign materials.

EXAMPLES

The present invention will be described in greater detail based on examples hereinbelow without limiting the scope of the invention.

Properties were measured or evaluated by the following methods.

[Evaluation Items]

1-Butene and Ethylene Contents

These contents were determined by $^{13}$C-NMR.

[Molecular Weight Distribution]

The molecular weight distribution (Mw/Mn) was determined by GPC (gel permeation chromatography) using gel permeation chromatograph Alliance GPC-2000 manufactured by Waters. The separatory columns used were two TSKgel GNH6-HT columns and two TSKgel GNH6-HTL columns, each having a diameter of 7.5 mm and a length of 300 mm. The column temperature was 140° C. The mobile phase was o-dichlorobenzene (Wako Pure Chemical Industries, Ltd.) containing 0.025 wt % of BHT (Takeda Chemical Industries, Ltd.) as an antioxidant. The mobile phase was pumped at a rate of 1.0 ml/min. The sample concentration was 15 mg/10 ml, and the sample injection amount was 500 µl. A differential refractometer was used as a detector. For molecular weights Mw<1000 and Mw>4×10$^6$, polystyrene standards manufactured by Toso Corporation were used. For molecular weights 1000≤Mw≤4×10$^6$, polystyrene standards available from Pressure Chemical Co. were used. Here, Mw and Mn represent weight average molecular weight and number average molecular weight, respectively.

[Melting Point]

The melting point (Tm) of the polymer was determined by differential scanning calorimetry (DSC). In detail, a polymer sample held at 240° C. for 10 minutes was cooled to 30° C. and held at the temperature for 5 minutes, and was thereafter heated at a temperature increasing rate of 10° C./min. The melting point was calculated from the peak assigned to crystal fusion by the temperature increasing.

[Intrinsic Viscosity [η]]

The intrinsic viscosity was measured at 135° C. in decalin and was expressed in dl/g.

[Melt Flow Rate (MFR)]

The melt flow rate (MFR) [g/10 min] of the copolymers (A) was determined in accordance with ASTM D1238 at 230° C. and under a load of 2.16 kg.

The melt flow rate (MFR) [g/10 min] of the copolymers (B) was determined in accordance with ASTM D1238 at 190° C. and under a load of 2.16 kg.

[Elastic Modulus of Films [Vertical/Horizontal]]

The elastic modulus of films [vertical (MPa)/horizontal (MPa)] was determined in accordance with ASTM D638.

[Film Impact Strength]

A 100 mm×100 mm film was tested with a film impact tester manufactured by Toyo Seiki Seisaku-Sho, Ltd. The impact hammer was a sphere with a diameter of 1 inch, and the testing temperature was −10° C. The impact strength was expressed in J/m.

[Fillability of Melt Bags]

A film 50 µm in thickness was made into a bag 50 cm in length and 30 cm in width. The bag was filled with 2 kg of carbon black, and the fillability was evaluated under the following criteria.

AA: The bag was self-standing with the mouth open.
BB: The bag needed a support of one hand to stand with the mouth open.
CC: The bag bent and the mouth was not open.

[Molten State of Melt Bags]

A film weighing 2 g was added to 100 g of a rubber compound (Mitsui EPT X-4010 manufactured by Mitsui Chemicals, Inc.) and these were kneaded together with an 85° C. roll for 5 minutes. The kneaded product was visually observed for unmolten film. The molten state was evaluated based on the following criteria.

AA: No unmolten film was observed.
BB: Almost no unmolten film was observed.
CC: Unmolten film was observed.

[Storage Stability of Melt Bags]

A film was stored at 40° C. for 6 months, and the storage stability was evaluated based on the following criteria.

AA: The film remained unchanged.
BB: The film remained almost unchanged.
CC: The film became brittle and collapsed.

Catalyst preparation examples, copolymer production examples and copolymer properties will be described below.

Catalyst Preparation Example 1

Synthesis of Dimethylmethylene (3-tert-butyl-5-methyl-cyclopentadienyl) (fluorenyl) zirconium dichloride

1) Synthesis of 1-tert-butyl-3-methylcyclopentadiene

In a nitrogen atmosphere, a solution of 43.7 g (0.45 mmol) of 3-methylcyclopentenone in 150 ml of dried diethyl ether was added dropwise to a solution obtained by adding dried diethyl ether (350 ml) to 450 ml (0.90 mol) of a 2.0 mol/L tert-butylmagnesium chloride/diethyl ether solution. During the dropwise addition, the temperature was kept at 0° C. by ice cooling. The mixture was stirred at room temperature for 15 hours. To the reaction solution, a solution of 80.0 g (1.50 mol) of ammonium chloride in 350 ml of water was added dropwise while keeping the temperature at 0° C. with ice cooling. Water in a volume of 2500 ml was added to the resultant solution, and the mixture was stirred. The organic phase was separated and washed with water. Thereafter, 82 ml of a 10% aqueous hydrochloric acid solution was added to the organic phase while the temperature was kept at 0° C. with ice cooling. The mixture was stirred at room temperature for 6 hours. The organic phase of the resultant reaction liquid was separated, then washed with water, a saturated aqueous sodium hydrogen carbonate solution, water and a saturated saline solution, and dried over anhydrous magnesium sulfate. The desiccant was filtered off, and the solvent was distilled away from the filtrate, resulting in a liquid. The liquid was distilled under reduced pressure (45-47° C./10 mm Hg) to give 14.6 g of a light yellow liquid. The analytical data are given below.

$^1$H-NMR (270 MHz, in CDCl$_3$, TMS standard) δ6.31+ 6.13+5.94+5.87 (s+s+t+d, 2H), 3.04+2.95 (s+s, 2H), 2.17+ 2.09 (s+s, 3H), 1.27 (d, 9H)

2) Synthesis of 3-tert-butyl-1,6,6-trimethylfulvene

In a nitrogen atmosphere, 55.2 g (950.4 mmol) of dried acetone was added dropwise to a solution of 13.0 g (95.6 mmol) of 1-tert-butyl-3-methylcyclopentadiene in 130 ml of dried methanol, and subsequently 68.0 g (956.1 mmol) of pyrrolidine was added thereto dropwise. During the dropwise addition, the temperature was kept at 0° C. by ice cooling. The mixture was stirred at room temperature for 4 days. The resultant reaction liquid was diluted with 400 ml of diethyl ether, and 400 ml of water was added. The organic phase was separated, then washed with a 0.5 N aqueous hydrochloric acid solution (150 ml×4), water (200 ml×3) and a saturated saline solution (150 ml), and dried over anhydrous magnesium sulfate. The desiccant was filtered off, and the solvent was distilled away from the filtrate, resulting in a liquid. The liquid was distilled under reduced pressure (70-80° C./0.1 mm Hg) to give 10.5 g of a yellow liquid. The analytical data are given below. $^1$H-NMR (270 MHz, in CDCl$_3$, TMS standard) δ6.23 (s, 1H), 6.05 (d, 1H), 2.23 (s, 3H), 2.17 (d, 6H), 1.17 (s, 9H)

3) Synthesis of 2-(3 tert-butyl-5-methyl cyclopentadienyl)-2-fluorenylpropane In a nitrogen atmosphere, 40 ml (61.6 mmol) of a hexane solution of n-butyllithium was added dropwise to a solution of 10.1 g (60.8 mmol) of fluorene in 300 ml of THF with ice cooling. The mixture was stirred at room temperature for 5 hours (resulting in a dark brown solution). The solution was ice cooled again, and a solution of 11.7 g (66.5 mmol) of 3-tert-butyl-1,6,6-trimethylfulvene in 300 ml of THF was added thereto dropwise in a nitrogen atmosphere. The mixture was stirred at room temperature for 14 hours. The resultant brown solution was ice cooled, and 200 ml of water was added. The organic phase was extracted with diethyl ether, then separated, and dried over magnesium sulfate. The desiccant was filtered off, and the solvent was removed from the filtrate under reduced pressure, resulting in an orange-brown oil. The oil was purified by silica gel column chromatography (developing solvent: hexane) to give 3.8 g of a yellow oil. The analytical data are given below.

$^1$H-NMR (270 MHz, in CDCl$_3$, TMS standard) δ7.70 (d, 4H), 7.34-7.26 (m, 6H), 7.18-7.11 (m, 6H), 6.17 (s, 1H), 6.01 (s, 1H), 4.42 (s, 1H), 4.27 (s, 1H), 3.01 (s, 2H), 2.87 (s, 2H), 2.17 (s, 3H), 1.99 (s, 3H), 2.10 (s, 9H), 1.99 (s, 9H), 1.10 (s, 6H), 1.07 (s, 6H)

4) Synthesis of dimethylmethylene(3-tert-butyl-5-methylcyclopentadienyl)fluorenylzirconium dichloride In a nitrogen atmosphere, 5.0 ml (7.7 mmol) of a hexane solution of n-butyllithium was added dropwise to a solution of 1.14 g (3.3 mmol) of 2-(3-tert-butyl-5-methylcyclopentadienyl)-2-fluorenylpropane in 25 ml of diethyl ether with ice cooling. The mixture was stirred at room temperature for 14 hours to give a pink slurry. Zirconium tetrachloride weighing 0.77 g (3.3 mmol) was added to the slurry at −78° C. The mixture was stirred at −78° C. for several hours and at room temperature for 65 hours. The resultant dark brown slurry was filtered. The residue was washed with 10 ml of diethyl ether, and the filtrate was extracted with dichloromethane to give a red solution. The solvent of the solution was distilled away under reduced pressure to give 0.53 g of a red orange solid. The analytical data are given below.

$^1$H-NMR (270 MHz, in CDCl$_3$, TMS standard) δ8.11-8.02 (m, 3H), 7.82 (d, 1H), 7.56-7.45 (m, 2H), 7.23-7.17 (m, 2H), 6.08 (d, 1H), 5.72 (d, 1H), 2.59 (s, 3H), 2.41 (s, 3H), 2.30 (s, 3H), 1.08 (s, 9H)

FD-MS: m/z=500, 502, 504 (M$^+$)

Production Example 1

PBR-1 (Preparation of Propylene/1-Butene Copolymer (A) with Metallocene Catalyst)

A 2000 ml polymerizer that had been thoroughly purged with nitrogen was charged with 866 ml of dried hexane, 90 g of 1-butene and 1.0 mmol of triisobutylaluminum at normal temperature. The temperature inside the polymerizer was increased to 65° C., and the polymerizer was pressurized to 0.7 MPa with propylene. Subsequently, there was added to the polymerizer a toluene solution in which 0.002 mmol of dimethylmethylene(3-tert-butyl-5-methylcyclopentadienyl) fluorenylzirconium dichloride and 0.6 mmol in terms of aluminum of methylaluminoxane (manufactured by Tosoh Finechem Corporation) were in contact with each other. Polymerization was carried out for 30 minutes while keeping the internal temperature at 65° C. and the propylene pressure at 0.7 MPa, and was terminated by the addition of 20 ml of methanol. The polymerizer was depressurized, and the polymer was precipitated by adding the polymerization solution to 2 L of methanol and was dried under vacuum at 130° C. for 12 hours. The polymer thus obtained weighed 12.5 g and had an intrinsic viscosity [η] of 1.63 dl/g and an mm fraction of 90%. The polymer also had a butene content of 27.9 mol %, a melting point (Tm) of 74.7° C., an MFR (230° C., 2.16 kg load) of 7.0 g/10 min, and Mw/Mn of 2.1.

With M being 27.9 in the equation of Requirement (5): $-2.6M+130 \leq Tm \leq -2.3M+155$, the equation became $57.46 \leq Tm \leq 90.83$. The melting point Tm: 74.7° C. satisfied this relation.

The above sample preparation was scaled up, and 10 kg of a polymer was obtained. The polymer had a butene content of 27.8 mol %, an intrinsic viscosity [η] of 1.63 dl/g, an mm fraction of 90%, a melting point (Tm) of 75° C., an MFR (230° C., 2.16 kg load) of 7.0 g/10 min, and Mw/Mn of 2.1.

Production Example 2

PBR-2 (Preparation of Propylene/1-Butene Copolymer (A) with Metallocene Catalyst)

Polymerization was carried out in the same manner as in Production Example 1, except that the amounts of hexane and 1-butene were 850 ml and 90 g, respectively, and that the temperature inside the polymerizer was changed to 60° C. The polymer obtained weighed 19.5 g. The polymer had a butene content of 16.9 mol %, a melting point (Tm) of 86.3° C., an MFR (230° C., 2.16 kg load) of 6.05 g/10 min, Mw/Mn of 2.11, an intrinsic viscosity [η] of 1.58 dl/g, and an mm fraction of 91%.

With M being 18.9 in the equation of Requirement (5): $-2.6M+130 \leq Tm \leq -2.3M+155$, the equation became $80.86 \leq Tm \leq -111.53$. The melting point Tm: 86.3° C. satisfied this relation.

The above sample preparation was scaled up, and 10 kg of a polymer was obtained. The polymer had a butene content of 16.8 mol %, an intrinsic viscosity [η] of 1.58 dl/g, an mm fraction of 91%, a melting point (Tm) of 86° C., an MFR (230° C., 2.16 kg load) of 6.1 g/10 min, and Mw/Mn of 2.1.

Production Example 3

Ethylene/1-Butene Copolymer (EBR-1) (B)

A 2000 ml polymerizer that had been thoroughly purged with nitrogen was charged with 890 ml of dried hexane, 65 g of 1-butene and 0.2 mmol of triisobutylaluminum at normal temperature. The temperature inside the polymerizer was increased to 90° C., and 150 N ml of hydrogen was added. The polymerizer was pressurized to 0.8 MPaG with ethylene. Polymerization was performed in the presence of 0.0005 mmol of [dimethyl(t-butylamido) (tetramethyl-η-5-cyclopentadienyl) silane]titanium dichloride and 0.0025 mmol of triphenylcarbenium tetra kispenta fluorophenyl) borate for 15 minutes while keeping the internal temperature at 90° C. and the ethylene pressure at 0.8 MPaG. The polymerization was terminated by the addition of 20 ml of methanol. The polymerizer was depressurized, and the polymer was precipitated by adding the polymerization solution to 2 L of methanol and was dried under vacuum at 130° C. for 12 hours. The polymer thus obtained weighed 69.5 g and had an intrinsic viscosity [η] of 1.50 dl/g. The polymer also had a butene content of 11.2 mol %, a melting point (Tm) of 67° C., an MFR (190° C., 2.16 kg load) of 3.6 g/10 min, and Mw/Mn of 2.1.

The above sample preparation was scaled up, and 10 kg of a polymer was obtained. The polymer had a butene content of 11.2 mol %, an intrinsic viscosity [η] of 1.50 dl/g, a melting point (Tm) of 67° C., an MFR (190° C., 2.16 kg load) of 3.6 g/10 min, and Mw/Mn of 2.1.

Production Example 4

Ethylene/1-Butene Copolymer (EBR-2)

A 2000 ml polymerizer that had been thoroughly purged with nitrogen was charged with 950 ml of dried hexane, 32 g of 1-butene and 0.2 mmol of triisobutylaluminum at normal temperature. The temperature inside the polymerizer was increased to 90° C., and 150 N ml of hydrogen was added. The polymerizer was pressurized to 0.8 MPaG with ethylene. Polymerization was performed in the presence of 0.0005 mmol of [dimethyl(t-butylamido) (tetramethyl-η-5-cyclopentadienyl)silane]titanium dichloride and 0.0025 mmol of triphenylcarbenium (tetrakispentafluorophenyl)borate for 15 minutes while keeping the internal temperature at 90° C. and the ethylene pressure at 0.8 MPaG. The polymerization was terminated by the addition of 20 ml of methanol. The polymerizer was depressurized, and the polymer was precipitated by adding the polymerization solution to 2 L of methanol and was dried under vacuum at 130° C. for 12 hours. The polymer thus obtained weighed 75.3 g. The polymer had a butene content of 5.2 mol %, a melting point of 96° C., an intrinsic viscosity [η] of 1.6 dl/g, and Mw/Mn of 2.0.

[Linear Low-Density Polyethylene (LLDPE)]

EVOLUE SP2520 (manufactured by Prime Polymer Co., Ltd., MFR=1.5 g/10 min (190° C., 2.16 kg), Tm=121° C.) was used as a linear low-density polyethylene (LLDPE).

[Ethylene Vinyl Acetate Copolymer (EVA)]

EVAFLEX EV460 (manufactured by DU PONT-MITSUI POLYCHEMICALS CO., LTD., MFR=2.5 g/10 min (190° C., 2.16 kg), Tm=84° C.) was used as an ethylene vinyl acetate copolymer (EVA).

[Polybutadiene]

Polybutadiene RB830 (manufactured by JSR Corporation, MFR=3 g/10 min (150° C., 2.16 kg), Tm=105° C.) was used.

[Ethylene/Octene Copolymer (EOR)]

TAFMER H-430 (manufactured by Mitsui Chemicals, Inc., melting point: 66° C., Mw/Mn: 2.1, MFR (190° C., 2.16 kg): 4 g/10 min) was used as ethylene/octene copolymer.

[Propylene/1-Butene Copolymer (PBR-3)]

TAFMER XR110T (manufactured by Mitsui Chemicals, Inc., melting point: 110° C., Mw/Mn: 4.2, MFR (230° C., 2.16 kg): 6 g/10 min) was used as propylene/1-butene copolymer (PBR-3).

Example 1

A blend consisting of 30 parts by weight of the propylene/1-butene copolymer (PBR-1) from Production Example 1 and 70 parts by weight of the ethylene/1-butene copolymer (EBR-1) (B) was formed into a single-layer film in a thickness of 150 μm by a blown-film extrusion method under the following forming and extrusion conditions. The film and a melt bag obtained therefrom (produced as described hereinabove) were evaluated for properties. The results are set forth in Table 2.

Blown-Film Extrusion Conditions

Blown-film extrusion apparatus: extruder (100 mm diameter) manufactured by Modern Machinery Screw: L/D=28

Compression ratio: 2.0

Dice diameter: 200 mm

Lip width: 1.5 mm

Extruder preset temperatures: cylinder 150° C., dice 135° C.

Swell ratio: 1.5

Take-up speed: 10 m/min

[Extrusion Conditions]
Resin pressure P: 150 kg/cm³
Resin output: 100 kg/hr
Resin temperature T: 140° C.

Examples 2 to 5

Materials were dry blended in the amounts shown in Table 2 to give resin compositions, and the compositions were formed into single-layer films in a thickness of 150 μm under the same conditions as in Example 1. The films and melt bags obtained therefrom (produced as described hereinabove) were evaluated for properties similarly to Example 1. The results are set forth in Table 2

Comparative Examples 1 to 7

Materials were dry blended in the amounts shown in Table 3 to give resin compositions, and the compositions were formed into single-layer films in a thickness of 150 μm under the same conditions as in Example 1. The films and melt bags obtained therefrom (produced as described hereinabove) were evaluated for properties similarly to Example 1. The results are set forth in Table 3.

The invention claimed is:

1. A melt bag which is formed using a resin composition, wherein the resin composition consists of:
  a propylene/1-butene copolymer (A),
  an ethylene/1-butene copolymer (B), and
  optionally, an additive which is at least one selected from the group consisting of antioxidants, lubricants, heat stabilizers, UV absorbers, anti-blocking agents, slip agents and antistatic agents,
wherein the weight ratio of these copolymers (A)/(B) is in the range of 90/10 to 70/30,
wherein the propylene/1-butene copolymer (A) is produced by copolymerizing propylene and 1-butene in the presence of a metallocene catalyst that contains a transition metal compound (1a) represented by Formula (1a) below, has (1) a melting point (Tm) of 40 to 85° C. as measured by differential scanning calorimetry (DSC) and contains (2) structural units derived from propylene in an amount of 60 to 80 mol % and structural units derived from 1-butene is an amount of 20 to 40 mol %, and

TABLE 2

| | | | Ex. 1 | Ex. 2 | Ex. 3 | Ex. 4 | Ex. 5 |
|---|---|---|---|---|---|---|---|
| Resin composition | PBR-1 | wt % | 30 | 50 | 70 | — | 50 |
| | PBR-2 | wt % | — | — | — | 50 | — |
| | EBR-1 | wt % | 70 | 50 | 30 | 50 | — |
| | EOR | wt % | — | — | — | — | 50 |
| Film properties | Film thickness | μm | 150 | 150 | 150 | 150 | 150 |
| | Melting point | ° C. | 72 | 73 | 75 | 68 86 | 73 |
| | Elastic modulus (vertical/horizontal) | MPa/MPa | 90/70 | 140/120 | 200/180 | 160/140 | 130/120 |
| | Film impact | J/m | 10 | 13 | N.B. | 20 | 15 |
| Melt bag properties | Fillability | | BB | BB | AA | AA | BB |
| | Molten state | | AA | AA | AA | BB | AA |
| | Storage stability | | AA | AA | AA | AA | AA |

*N.B.: Not Break (The film was not broken in the evaluation.)

TABLE 3

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Resin composition | PBR-1 | wt % | — | — | — | — | 30 | 50 | — |
| | PBR-2 | wt % | — | — | — | — | — | — | — |
| | PBR-3 | wt % | — | — | — | — | — | — | 50 |
| | EBR-1 | wt % | 100 | — | — | — | — | — | 50 |
| | EBR-2 | wt % | — | — | — | — | — | 50 | — |
| | LLDPE | wt % | — | 100 | — | 45 | 70 | — | — |
| | EVA | wt % | — | — | — | 55 | — | — | — |
| | Polybutadiene | wt % | — | — | 100 | — | — | — | — |
| Film properties | Film thickness | μm | 150 | 150 | 150 | 150 | 150 | 150 | 150 |
| | Melting point | ° C. | 67 | 121 | 105 | 87 113 | 75 113 | 75 96 | 67 110 |
| | Elastic modulus (vertical/horizontal) | MPa/MPa | 30/30 | 180/180 | 130/150 | 150/150 | 190/170 | 130/120 | 170/150 |
| | Film impact | J/m | 6 | 18 | 16 | 18 | 10 | 15 | 13 |
| Melt bag properties | Fillability | | CC | AA | BB | BB | BB | BB | AA |
| | Molten state | | AA | CC | AA | CC | CC | CC | CC |
| | Storage stability | | AA | AA | CC | AA | AA | AA | AA |

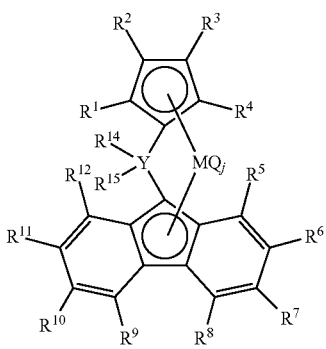

(1a)

wherein, in Formula (1a), $R^1$ and $R^3$ are each a hydrogen atom; $R^2$ and $R^4$ are each selected from hydrocarbon groups and silicon-containing groups and may be the same or different from each other $R^3$, $R^6$, $R^7$, $R^8$, $R^9$, $R^{10}$, $R^{11}$, $R^{12}$, $R^{13}$ and $R^{14}$ are each selected from hydrogen atom, hydrocarbon groups and silicon-containing groups and may be the same or different from one another; adjacent substituent groups of $R^5$ to $R^{12}$ may be linked with each other to form a ring; $R^{13}$ and $R^{14}$ are the same or different from each other and may be linked together to form a ring; M is a Group 4 transition metal; Y is a carbon atom; Q is a halogen, a hydrocarbon group, an anionic ligand or a neutral ligand capable of coordination via a lone pair of electrons, and may be the same or different when plural; and j is an integer ranging from 1 to 4, and
wherein the ethylene/1-butene copolymer (B) has (1) a melting point (Tm) of 40 to 85° C. as measured by differential scanning calorimetry (DSC) and contains (2) structural units derived from ethylene in an amount of 50 to 95 mol % and structural units derived from 1-butene in an amount of 5 to 50 mol %.

2. The melt bag according to claim 1, wherein the propylene/1-butene copolymer (A) has:
   (3) a molecular weight distribution (Mw/Mn) of not more than 3.0 as measured by gel permeation chromatography (GPC).

3. The melt bag according to claim 1, wherein the ethylene/1-butene copolymer (B) has:
   (3) a molecular weight distribution (Mw/Mn) of not more than 3.0 as measured by gel permeation chromatography (GPC).

4. The melt bag according to claim 1, wherein the propylene/1-butene copolymer (A) has:
   (6) a triad tacticity (mm fraction) of not less than 90% as determined using $^{13}$C-NMR.

5. The melt bag according to claim 1, wherein the ethylene/1-butene copolymer (B) has:
   (4) the intrinsic viscosity [η] within the range of 0.1 to 12 dl/g as measured at 135° C. in decalin and
   (5) a melt flow rate (MFR) within a range of 0.2 to 35 g/10 min as determined at 190° C. under a load of 2.16 kg in accordance with ASTM D1238.

6. The melt bag according to claim 1, wherein the propylene/1-butene copolymer (A) has:
   (4) the intrinsic viscosity [η] within the range of 0.1 to 12 dl/g as measured at 135° C. in decalin,
   (5) the melting point (Tm) of 40 to 85° C. as measured by differential scanning calorimetry (DSC) and the melting point (Tm) and the content (M) (mol %) of structural unit derived from 1-butene satisfying the following reaction:

$-2.6M+130 \leq Tm \leq -2.3M+155$ and
   (7) a melt flow rate (MFR) within a range of 1 to 10 g/10 min as determined at 230° C. under a load of 2.16 kg in accordance with ASTM D1238.

7. A package which includes the melt bag described in claim 1.

* * * * *